(No Model.) 2 Sheets—Sheet 2.
C. T. H. RICHTER.
COMBINED SEAT, EASEL, AND SUNSHADE.
No. 375,953. Patented Jan. 3, 1888.
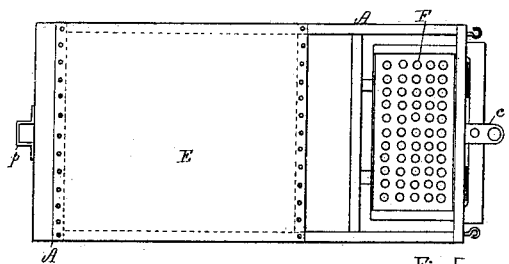
Fig. 3.
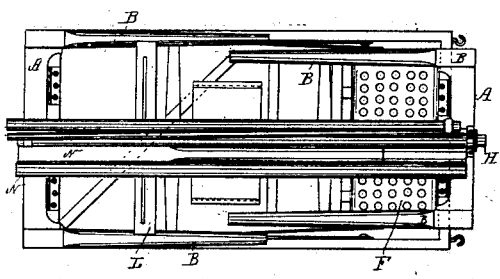
Fig. 4.
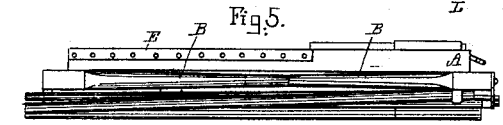
Fig. 5.
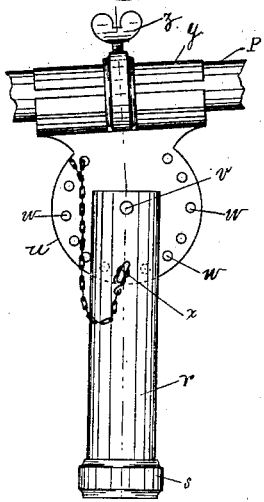
Fig. 6.
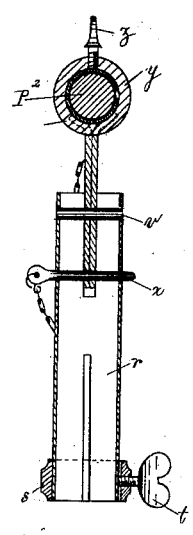
Fig. 7.
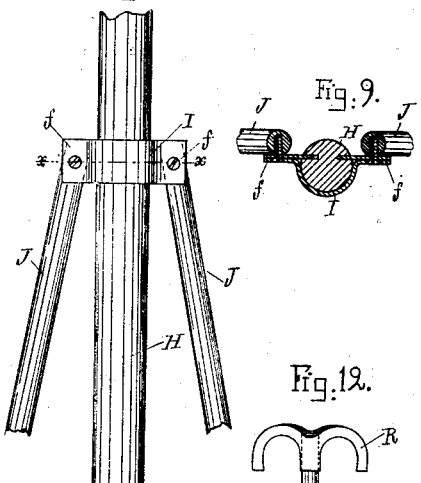
Fig. 8.
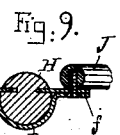
Fig. 9.
Fig. 12.
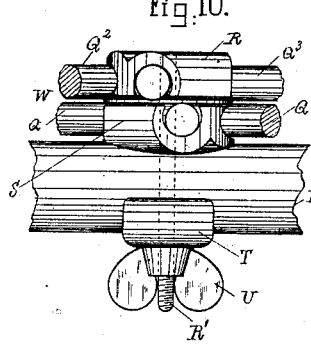
Fig. 10.
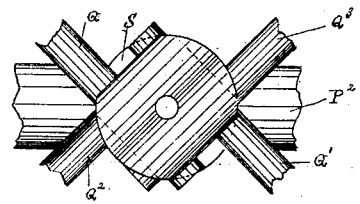
Fig. 11.
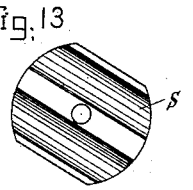
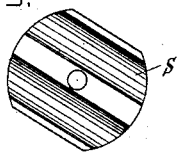
Fig. 13.
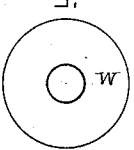
Fig. 15.
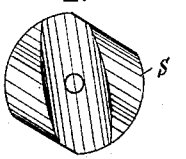
Fig. 14.
Witnesses.
E. Planta
L. W. Möller
Inventor
C. T. H. Richter

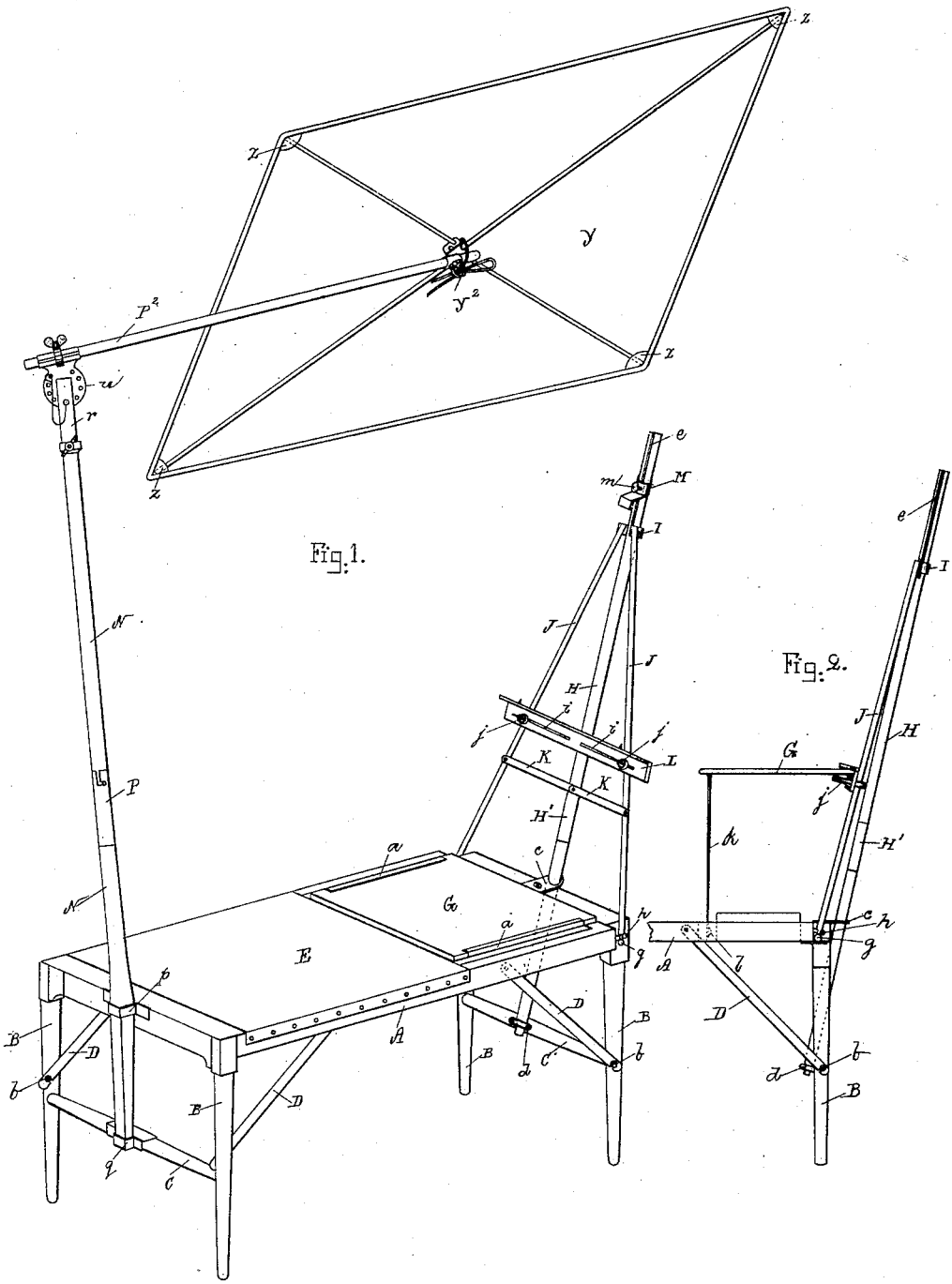

UNITED STATES PATENT OFFICE.

CARL T. H. RICHTER, OF EAST DEDHAM, MASSACHUSETTS.

COMBINED SEAT, EASEL, AND SUNSHADE.

SPECIFICATION forming part of Letters Patent No. 375,953, dated January 3, 1888.

Application filed May 4, 1887. Serial No. 237,134. (No model.)

*To all whom it may concern:*

Be it known that I, CARL T. H. RICHTER, a citizen of the United States, residing at East Dedham, in the county of Norfolk and State of Massachusetts, have invented a new and useful Improvement in Combined Seat, Easel, and Sunshade, of which the following is a specification.

The object of my invention is to produce a combined seat, easel, and sunshade suitable for outdoor sketching, and which will be very light and fold into a comparatively small space, so that it can be easily carried by the hand.

The invention consists of certain details of construction, hereinafter fully set forth, and pointed out in the claims.

Referring to the accompanying drawings, Figure 1 represents a perspective view of a combined seat, easel, and sunshade embodying my invention. Fig. 2 is a side view of a portion of the same. Fig. 3 is a plan or top view of the seat. Fig. 4 is a view of the underside, showing it folded up. Fig. 5 is a side view of same. Figs. 6 to 15 are details of various parts.

A represents a rectangular frame, to the four corners of which are hinged legs B B, each pair of legs being connected together by a rail or cross-bar, C. The legs B are held in an extended position by means of iron braces D, the inner ends of which are pivoted to the rectangular frame A, and their outer ends are each provided with a slot or notch to pass over pins or studs $b$ on the legs B.

E is a piece of canvas secured over a portion of the top of the rectangular frame A, and forms a seat. In front of this seat E is secured a tray, F, (see Fig. 3,) for holding paints, brushes, &c., and is covered by a flat piece of wood, G, that fits and slides in guides $a$.

H is the main bar or leg of the easel, made in two parts and secured together by means of a ferrule, H', and is held in position by being passed through a brace, $c$, secured to the front of the frame A, and having its lower end passing into an eye, $d$, on the front rail, C. At the upper end of the bar H, on each side, is formed a groove, $e$, in which a slide, I, is free to move up and down. This slide is provided with a wing or projection, $f$, on each side, to which are hinged the side bars or lugs, J, of the easel. (Shown drawn to a large scale in Figs. 8 and 9, Fig. 8 being a view from the rear of the easel, and Fig. 9 a section taken on line $x\ x$ of Fig. 8.) The lower ends of the side bars, J, are provided with pins or studs $g$, that fit into loops or eyes $h$ on the frame A. (See Fig. 1.)

K K are two bars of metal, the inner ends of which are secured to the main bar H of the easel, and their outer ends are secured to the bars or legs J, so that when the easel is in the position shown in Fig. 1 the bars K K will keep the bars or legs J from spreading; but when it is desired to fold up the easel the bars J J can be brought to the side of the main bar H, (after the ends have been detached from the loops or eye $g$,) the upper ends of the bars J J being free to slide up the end of the bar H by means of the slide I and grooves $e\ e$.

L is a rest or support for the sketching block or canvas, and is attached or secured to the bars or legs J by means of set-screws $j\ j$, (see Figs. 1 and 2,) the said screws being provided with eyes that are passed over the legs J J, the screw passing through slots $i$ in the rest L and clamped by means of thumb-nuts. By means of the slots $i$ the rest L can readily be adjusted at any required height.

M is a clasp free to slide upon the upper part of the bar H, to hold or clasp the upper part of the canvas or sketching block, and when the clamp M is in the desired position it can be secured by the set-screw $m$.

If it should be desired to have a table in front of the easel, I take the cover G and insert one side of it between the set-screws $j$ and the projecting flange of the rest L, (see Fig. 2,) and the outer end I support by means of rods or bars $k$, hinged or pivoted at their lower ends to the frame A, at $l$, and their upper ends fitting into eyes or recesses on the under side of the table G. These bars $k$, I prefer to place diagonally—that is, the bar that is connected to one side of the frame A supports the opposite corner of the table G, so that the bars cross each other.

N is a standard, made in two parts and secured together by means of a ferrule provided with a bayonet-joint. This standard is supported and carried by means of two straps, one, $p$, being attached to the frame A and one, $q$, to the rail C. The upper end of the standard N is fitted with an adjustable joint for holding the bar or stick that carries the sunshade. This joint is shown drawn to an enlarged scale in Figs. 6 and 7, Fig. 6 being a side view, and Fig. 7 a vertical section through the same.

$r$ is the ferrule that fits over the upper end of the standard N. A ring, $s$, is securely attached to one side of ferrule $r$, the opposite side being provided with a thumb-screw, $t$. The lower end of the ferrule is slit up on each side, so that when it is desired to clamp the ferrule to the standard N the thumb screw $t$ is turned and compresses one side of the ferrule onto the standard. To the upper end of the ferrule $r$ a quadrant, $u$, is fulcrumed at $v$, and is provided on its outer edge with a series of holes, $w$, so that it can be held in any required position by means of a pin, $x$. The upper end of the quadrant $w$ is provided with a clamp, $y$, in which the rod or bar $P^2$ can be secured by thumb screw $z$.

The outer end of the bar or rod $P^2$ is provided with a swivel-grip or clamping device for supporting the extension-sticks Q Q' $Q^2$ $Q^3$, carrying the silk, cloth, or other material employed for the sunshade. This swivel grip is shown drawn to a larger scale in Figs. 10 to 14, Fig. 10 being a side view, Fig. 11 a top or plan view, Fig. 12 an edge view of the upper grip and bolt, Fig. 13 a top view of the lower grip, Fig. 14 a bottom view of the same, and Fig. 15 is a view of the washer that is placed between the extension-sticks and the upper and lower grip. The upper grip, R, is made in the form of a double saddle, and is provided with a screw, R'. The lower grip, S, is also made in the form of a double saddle, and is provided in the center with a hole for the screw R' to pass through, and the under side is hollowed or rounded out to fit over the bar or rod $P^2$.

In applying this swivel-grip to the bar or rod $P^2$ for carrying the extension-sticks Q Q the washer W and lower grip, S, is first slipped onto the screw R', which is then passed through a hole in the bar $P^2$. A plate, T, is then placed on the screw R' and all the parts are held by a thumb-nut, U. When it is desired to use the sunshade, the ends of the extension-sticks Q Q' are placed in the recessed or saddle-shaped parts of the lower grip, and under the washer W. (See Fig. 10.) The extension-sticks $Q^2$ $Q^3$ are then inserted in the recessed or saddle-shaped parts of the upper grip and above the washer W. The thumb-nut U is then turned and draws the upper grip, R, down, thereby clamping the extension-sticks, as shown. When the extension-sticks Q have been inserted and clamped in position, a covering, Y, of silk, cotton, or other suitable material, is spread over them, as shown, (see Fig. 1,) a pocket, Z, being formed in each corner that is passed over the ends of the extension-sticks Q. In the center of the cover Y, I secure a tape, $Y^2$, by means of which I secure the center of the cover to the bar $P^2$, so that the cover will not hold the wind.

When not required for use, the whole apparatus can be folded up, as shown in Figs. 4 and 5, and can be easily carried in the hand, the weight being only about six pounds.

It will be seen by the above arrangement and construction I am enabled to produce a combined seat, easel, and sunshade that can be packed into a small space and readily and easily be opened out when required for use.

If desired, the canvas E may be placed entirely over the top of the frame A and the easel be dispensed with, in which case a portable seat and sunshade is produced applicable for outdoor use.

What I claim as my invention is—

1. A seat consisting of a rectangular frame, A, canvas E, folding legs B, and provided with a tray, F, in combination with an easel consisting of the main bar H, side bars, J, and rest L, connected to and supported by the seat, substantially as shown and described.

2. A seat consisting of the rectangular frame A, canvas E, and folding legs B, in combination with the sunshade Y, rod or bar $P^2$, swivel-grip R S, and standard N, secured to and supported by the seat, substantially as shown and described.

3. In a combined seat and easel, the main bar H, secured to the seat by brace $c$ and eye $d$, in combination with the side bars, J J, the upper end being secured to the slide I and the lower ends being provided with pins or studs $g$, fitting into eyes $h$ on the frame A, and the bars K K, substantially as shown and described.

4. In a combined seat and easel, the rest or support L, provided with slots $i$, in combination with screws $j\ j$, provided with eyes for attachment to bars J, whereby the rest can be raised or lowered and secured in any desired position, substantially as shown and described.

5. In a combined seat and sunshade, the adjustable joint consisting of the ferrule $r$, ring $s$, thumb-screw $t$, quadrant $u$, pin $x$, clamp $y$, and thumb-screw $z$, in combination with standard N and bar P, substantially as and for the purposes set forth.

6. In a combined seat and sunshade, the swivel gripping device consisting of the upper grip, R, provided with screw R', the lower grip, S, plate T, and thumb nut U, in combination with the extension-sticks Q Q' $Q^2$ $Q^3$ and bar $P^2$, substantially as and for the purposes set forth.

7. In a combined seat and sunshade, the sunshade Y, provided with pockets Z Z and tape $Y^2$, in combination with the extension-sticks Q Q' $Q^2$ $Q^3$, swivel-gripping device, and rod or bar $P^2$, whereby the shade is prevented from holding the wind, substantially as shown and described.

In testimony whereof I have signed my name to this specification in the presence of two subscribing witnesses.

CARL T. H. RICHTER.

Witnesses:
 JOS. G. HOLT,
 E. PLANTA.